United States Patent [19]

Cronk

[11] Patent Number: 4,985,660
[45] Date of Patent: Jan. 15, 1991

[54] VEHICLE WINDSHIELD WIPER LIGHT CIRCUIT

[76] Inventor: John E. Cronk, 2594 Spruce Creek Blvd., Daytona Beach, Fla. 32127

[21] Appl. No.: 476,178

[22] Filed: Feb. 7, 1990

[51] Int. Cl.5 .............................................. B60Q 1/02
[52] U.S. Cl. ...................................... 315/82; 307/10.8
[58] Field of Search ...................... 315/82, 83, 200 R; 307/10.1, 10.8

[56] References Cited

U.S. PATENT DOCUMENTS

| 3,500,119 | 3/1970 | Price | 315/82 |
|---|---|---|---|
| 3,500,120 | 3/1970 | Schultz | 315/82 |
| 3,519,837 | 7/1970 | Nolin et al. | 315/82 X |
| 3,591,845 | 7/1971 | Vanderpoel, Jr. | 315/82 X |
| 3,600,596 | 8/1971 | Aloisantoni | 307/10.8 |
| 3,824,405 | 7/1974 | Glaze | 307/10.8 |
| 3,879,617 | 4/1975 | Faller | 307/10.8 |
| 3,909,619 | 9/1975 | Kniesly et al. | 315/83 X |
| 4,010,380 | 5/1977 | Bailer et al. | 315/82 |
| 4,057,742 | 11/1977 | Binegar | 315/82 X |
| 4,139,801 | 2/1979 | Linares | 307/10.8 X |
| 4,337,400 | 6/1982 | Hahn | 315/82 X |

FOREIGN PATENT DOCUMENTS 2264481  9/1972  Fed. Rep. of Germany ........ 315/82

Primary Examiner—Robert J. Pascal
Attorney, Agent, or Firm—Edward M. Livingston

[57] ABSTRACT

Windshield wiper light circuitry for a device that automatically turns on vehicle head lights and other lights whenever the wipers are on is provided. A double-pole, single-throw relay switch (1) is positioned in vehicle circuitry between the ignition switch (13) and the light switch (14). One of the two poles has as electrical lead (3) to the low-beam head lights and the other (4) to the rear lights, park lights and side lights together. A diode rectifier (12) is provided in circuitry between a line (9) for continuous operation and a line (7) for intermittent operation of a wiper motor (11).

4 Claims, 1 Drawing Sheet

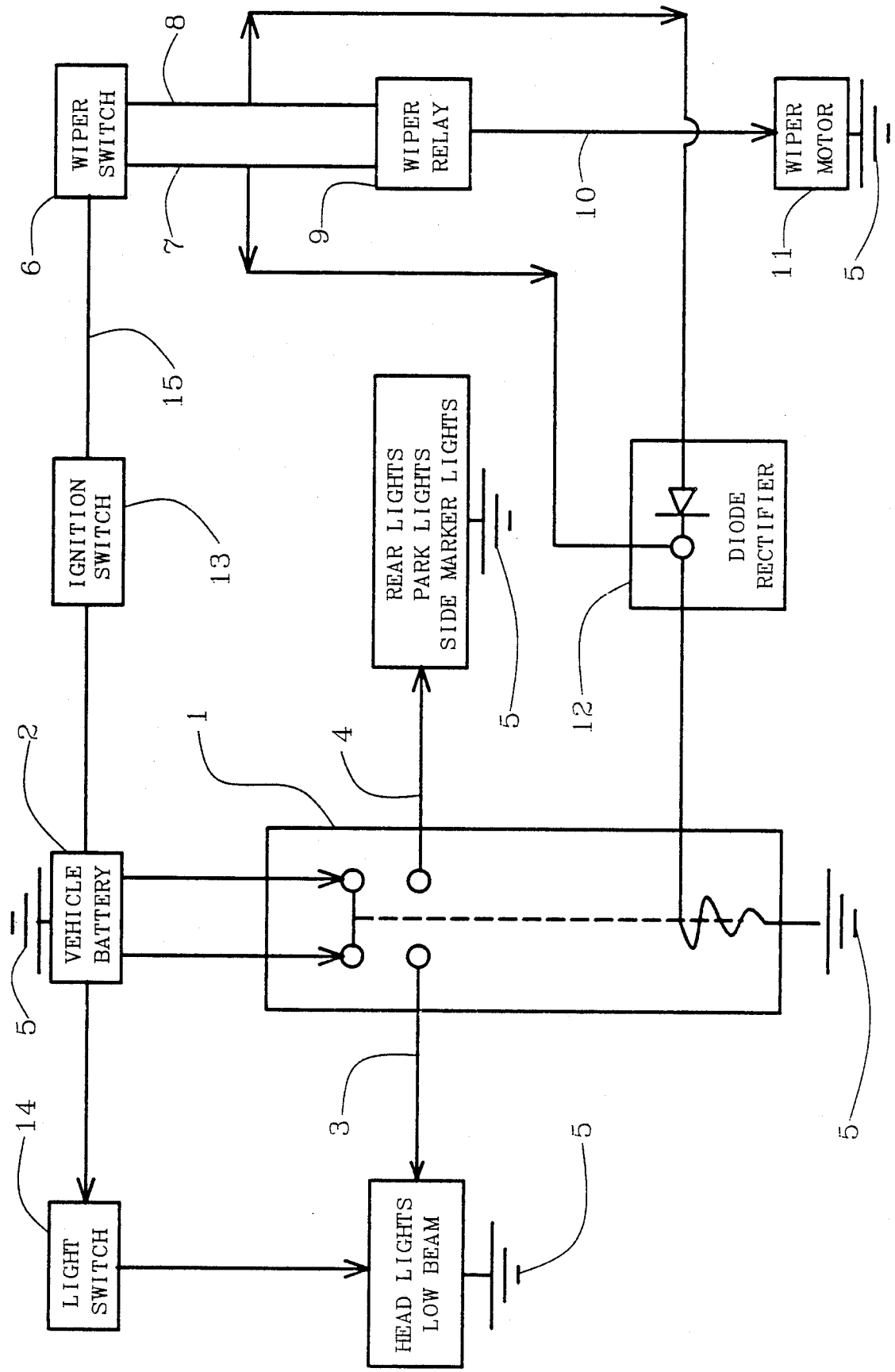

VEHICLE WINDSHIELD WIPER LIGHT CIRCUIT

BACKGROUND OF THE INVENTION

This invention relates to switching circuitry for turning on head lights automatically when turning on electrical windshield wipers.

The laws of most states require that vehicle lights be turned on whenever windshield wipers are used. Unfortunately, many drivers fail to turn on the headlights because it requires that two switches be turned on. Moreover, after turning on the lights during daytime in rainy weather, the driver often forgets to turn the lights off resulting in a dead battery and a car which will not start. Thus, their exists a need for wiper circuitry for a device that will automatically turn on and turn off the lights of a vehicle with the windshield wipers.

This invention relates to switching circuitry for turning on head lights automatically when turning on electrical windshield wipers.

There have been various switching circuitry for turning on vehicle lights when turning on the windshield wipers. However, none have been sufficiently convenient, low-cost and reliable to become widely used. Included have been the following U.S. Pat. Nos.:

| | | |
|---|---|---|
| 4,097,839 | Lesiak | 1978 |
| 4,010,380 | Bailer | 1977 |
| 3,767,966 | Bell | 1973 |
| 3,909,619 | Knisely | 1975 |
| 3,591,845 | Vanderpoel | 1971 |
| 3,500,119 | Price | 1970 |
| 3,500,120 | Schultz | 1970 |
| 3,519,837 | Nolin | 1970 |

The Lesiak patent simplified earlier technology but not to the extent of Applicant's device. Different from the Lesiak patent, Applicant provides a separate switch which causes the windshield wiper switch to turn lights onto low beam and to turn on the tail lights and side lights simultaneously. Moreover, Applicant's circuitry causes said lights to come on even if the windshield wiper switch is placed on intermittent operation, whereas the prior art does not.

Different also from the Bailer patent as present wiper switches can be used when Applicant's switch circuitry is installed either as original equipment or as an after-sale add-on.

SUMMARY OF THE INVENTION

One object of this invention is to provide a switch that turns on head lights automatically when an electrical windshield wiper is turned on.

Another object is to provide low-cost, wiper-switch-operated light switch that can be added as original equipment manufacture without changing existing windshield-wiper or light switch circuitry.

Another object is to provide low-cost wiper-switch-operated light switch that can be installed as add-on equipment after original sale of vehicles.

Still another object is to provide a wiper-switch-operated light switch that is sufficiently reliable to meet legal requirements of various states for turning on lights when windshield wipers are being operated.

A double-pole, single-throw relay switch is positioned in vehicle circuitry between the ignition switch and the light switch. One of the two poles has an electrical lead to the low-beam head lights and the other to the rear lights, park lights and side lights together. A diode rectifier is provided in circuitry between a line for continuous operation and a line intermittent operation of a wiper motor.

DESCRIPTION OF THE DRAWING

The drawing of this invention is a black-box diagram of the circuitry and positioning of components.

DETAILED DESCRIPTION OF THE PREFERRED EMBODIMENTS

Referring to the drawing, a double-pole, single-throw automatic relay switch 1 is positioned in live electrical circuitry from a vehicle battery 2 and provided with a headlight lead 3 from one pole and a rear-light and other select light lead 4 from the other pole. A ground 5 is provided for each terminal.

A wiper switch 6 is provided with an intermittent-circuitry line 7 and a high-and-low-speed circuitry line 8 leading to a wiper relay 9 with a wiper-current line 10 to wiper motor 11.

A diode rectifier 12 is positioned in rectifier circuitry from the intermittent-circuitry line 7 and the high-and-low-speed circuitry line 8 to ground 5.

Leading from the ignition switch 13 to the wiper switch 6, back to the relay switch 1 and to light switch 14 is relay circuitry 15 which is activated with electrical current when the wiper switch 6 is turned on to intermittent or to either level of constant-speed operation.

The diode rectifier 12 is a current gate which causes constant current to the head lights and other select lights when either intermittent or constant current are supplied to the wiper and to the relay switch 1.

Thus, the present invention as described herein fulfills the objects set forth in the Summary of the Invention. Although only one embodiment has been described and illustrated, modifications thereto which accomplish the same results are intended to fall within the scope and spirit of the claims.

I claim:

1. An automatic windshield-wiper light circuit in a motor vehicle having headlights, tail lights, auxiliary lights and an electrical windshield wiper in electrically-operative circuitry with an electrical supply source comprising:
    an intermittent-current electrical line in electrical communication between a windshield-wiper switch and a windshield-wiper relay switch;
    a multiple-speed electrical line in electrical communication between the windshield-wiper switch and the windshield-wiper relay switch;
    rectifier circuitry in electrical communication between the intermittent-current electrical line and the multiple-speed electrical line.
    a diode rectifier in the rectifier circuitry;
    an automatic light relay switch in current-communicative relationship between the windshield-wiper switch and select lights of the vehicle; and
    an electrical circuit in communication between the lines to the windshield-wiper relay switch and the automatic light relay switch when the windshield wiper-switch is switched to electrical communication with the electrical supply source.

2. An automatic windshield-wiper light circuit according to claim 1 wherein the automatic light relay switch is a single-throw, double-pole switch having electrically contactable relationship to a separate light circuitry at each pole.

3. An automatic windshield-wiper light circuit according to claim 2 wherein the light circuitry contactable with one pole is for low-beam head lights and the light circuitry contactable with the other pole is for tail lights to the vehicle.

4. A method for using an automatic windshield-wiper light consisting of
   an intermittent-current electrical line in electrical communication between a windshield-wiper switch and a windshield-wiper relay switch;
   a multiple-speed electrical line in electrical communication between the windshield-wiper switch and the windshield-wiper relay switch;
   rectifier circuitry in electrical communication between the intermittent-current electrical line and the multiple speed electrical line;
   a diode rectifier in the rectifier circuitry;
   an automatic light relay switch in a current-communicative relationship between the windshield-wiper switch and select lights of the vehicle; and
   an electrical circuit in communication between the lines to the windshield-wiper relay switch and the automatic light relay switch when the windshield-wiper switch is switched to electrical communication with the electrical supply source and comprising the following steps:
   (a) attaching the automatic light relay switch in live circuitry from a vehicle battery in convenient proximity to headlight and select other light lines;
   (b) attaching a rectifier diode circuit between an intermittent and constant-speed electrical-current line from the vehicle wiper switch to a ground; and
   (c) attaching a relay circuit line from the wiper switch to the double-poles of the double-pole relay.

* * * * *